(12) United States Patent
Nakayama (10) Patent No.: US 11,448,121 B2
(45) Date of Patent: Sep. 20, 2022

(54) OUTBOARD MOTOR AND ENGINE MECHANISM

(71) Applicant: YAMAHA HATSUDOKI KABUSHIKI KAISHA, Iwata (JP)

(72) Inventor: Koichi Nakayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 134 days.

(21) Appl. No.: 17/066,515

(22) Filed: Oct. 9, 2020

(65) Prior Publication Data

US 2021/0156301 A1    May 27, 2021

(30) Foreign Application Priority Data

Nov. 21, 2019  (JP) .............................. JP2019-210164

(51) Int. Cl.
  *F02B 61/04*   (2006.01)
  *F02B 75/22*   (2006.01)
  *B63H 20/24*   (2006.01)
  *F02B 75/18*   (2006.01)

(52) U.S. Cl.
  CPC ........... *F02B 61/045* (2013.01); *B63H 20/24* (2013.01); *F02B 75/22* (2013.01); *F01N 2590/021* (2013.01); *F02B 2075/1832* (2013.01)

(58) Field of Classification Search
  CPC ................... F02B 61/045; F02B 75/22; F02B 2075/1832; F01N 2590/021; B63H 20/24
  See application file for complete search history.

(56) References Cited

U.S. PATENT DOCUMENTS

| 8,668,538 B1 * | 3/2014 | Langenfeld | B63H 21/34 |
| | | | 440/89 H |
| 9,964,029 B1 | 5/2018 | Loberger et al. | |
| 2008/0081523 A1 * | 4/2008 | Ide | F02M 35/10111 |
| | | | 440/88 A |

FOREIGN PATENT DOCUMENTS

EP            3064723 A1 *  9/2016  ............. B63H 20/24

* cited by examiner

*Primary Examiner* — Stephen P Avila
(74) *Attorney, Agent, or Firm* — Keating and Bennett, LLP (57) ABSTRACT

An outboard includes a plurality of first branched pipes connected to a plurality of first exhaust ports and a plurality of second branched pipes connected to a plurality of second exhaust ports, respectively, wherein the plurality of first branched pipes are connected to a first collecting pipe and the plurality of second branched pipes are connected to a second collecting pipe. A connector connects the first collecting pipe and the second collecting pipe. The plurality of first branched pipes extend in a direction away from the connector in a plan view, and each includes a first exhaust pathway located farther away from the connector than the first collecting pipe is in the plan view. The plurality of second branched pipes extend in a direction away from the connector in a plan view, and each includes a second exhaust pathway located farther away from the connector than the second collecting pipe.

14 Claims, 4 Drawing Sheets

OUTBOARD MOTOR AND ENGINE MECHANISM

CROSS REFERENCE TO RELATED APPLICATIONS

This application claims the benefit of priority to Japanese Patent Application No. 2019-210164 filed on Nov. 21, 2019. The entire contents of this application are hereby incorporated herein by reference.

BACKGROUND OF THE INVENTION

1. Field of the Invention

The present invention relates to an outboard motor and an engine mechanism.

2. Description of the Related Art

In an engine such as a V-type 8-cylinder engine, exhaust ports are opened before pistons reach a bottom dead center in an exhaust process. In other words, at a certain point, the exhaust ports and intake ports are opened simultaneously. Due to these simultaneously opened ports, the air is taken into combustion chambers from the intake ports, and burned gas is actively exhausted and scavenged from the exhaust ports. The scavenging reduces temperatures of the combustion chambers and enhances combustion efficiency.

When the exhaust ports and the intake ports are opened simultaneously, a pressure of exhaust gas discharged from one cylinder affects exhaust gas of another cylinder, which may cause exhaust interference. In a case, for example, where exhaust pipes connected to the exhaust ports are short, a pressure of exhaust gas discharged from one cylinder is easily transmitted to a combustion chamber of another cylinder. The occurrence of exhaust interference makes it difficult to scavenge combustion gas sufficiently, which causes an increase in temperature inside the combustion chambers and causes ignition retardance, which causes a decrease in combustion efficiency.

In a known exhaust mechanism of an engine, a plurality of exhaust ports are connected to a collecting pipe so that exhaust gas from the plurality of exhaust ports is collected (see U.S. Pat. No. 9,964,029). The collecting pipe of the exhaust mechanism temporarily moves the exhaust gas upward, and then, guides the exhaust gas downward.

The above-described collecting pipe has an upward guide unit oriented upward and a downward guide unit oriented downward. For this reason, it is required to arrange the collecting pipe near the exhaust ports so as to secure a space for the upward guide unit and the downward guide unit. However, when the exhaust ports are immediately connected to the collecting pipe, a pressure of exhaust gas discharged from one cylinder affects exhaust gas of another cylinder, leading to a possibility of exhaust interference.

SUMMARY OF THE INVENTION

Preferred embodiments of the present invention provide outboard motors that each prevent exhaust interference and enhance combustion efficiency.

An outboard motor according to a preferred embodiment of the present invention includes an engine, a propeller shaft, a plurality of first branched pipes, a plurality of second branched pipes, a first collecting pipe, a second collecting pipe, and a connector. The engine includes a first bank and a second bank. The first bank includes a plurality of first cylinders and a plurality of first exhaust ports. The plurality of first exhaust ports are connected to the plurality of first cylinders, respectively. The second bank includes a plurality of second cylinders and a plurality of second exhaust ports. The plurality of second exhaust ports are connected to the plurality of second cylinders, respectively. The propeller shaft extends in a front-back direction. The propeller shaft transmits a driving force from the engine to a propeller. The plurality of first branched pipes are connected to the plurality of first exhaust ports, respectively. The plurality of second branched pipes are connected to the plurality of second exhaust ports, respectively. The plurality of first branched pipes are connected to the first collecting pipe. The plurality of second branched pipes are connected to the second collecting pipe. The connector connects the first collecting pipe and the second collecting pipe. The plurality of first branched pipes extend in a direction away from the connector in a plan view. The plurality of first branched pipes include a first exhaust pathway. In a plan view, the first exhaust pathways are located farther away from the connector than the first collecting pipe is. The plurality of second branched pipes extend in a direction away from the connector in a plan view. The plurality of second branched pipes include a second exhaust pathway. In a plan view, the second exhaust pathways are located farther away from the connector than the second collecting pipe is.

According to preferred embodiments of the present invention, it is possible to provide outboard motors that prevent exhaust interference and enhance combustion efficiency.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An outboard motor according to a preferred embodiment of the present invention includes an engine 300, a propeller shaft 250, first branched pipes 410a, second branched pipes 410b, a first collecting pipe 452, a second collecting pipe 454, and a connector 460.

The engine 300 includes a first bank 310 and a second bank 320.

The first bank 310 includes cylinders C1, C3, C5, and C7 and exhaust ports 350a. The exhaust ports 350a are respectively connected to the cylinders C1, C3, C5, and C7.

The second bank 320 includes cylinders C2, C4, C6, and C8 and exhaust ports 350b. The exhaust ports 350b are respectively connected to the plurality of cylinders C2, C4, C6, and C8.

The propeller shaft 250 extends in a front-back direction. The propeller shaft 250 transmits a driving force from the engine 300 to a propeller 220.

The first branched pipes 410*a* are connected to the exhaust ports 350*a*. The second branched pipes 410*b* are connected to the exhaust ports 350*b*. The first branched pipes 410*a* are connected to the first collecting pipe 452. The second branched pipes 410*b* are connected to the second collecting pipe 454. The connector 460 connects the first collecting pipe 452 and the second collecting pipe 454.

The first branched pipes 410*a* extend in a direction away from the connector 460 in a plan view. Each first branched pipe 410*a* includes a branched pipe exhaust pathway 440*a*. In a plan view, the branched pipe exhaust pathways 440*a* are located farther away from the connector 460 than the first collecting pipe 452 is.

In a plan view, the second branched pipes 410*b* extend in a direction away from the connector 460. Each second branched pipe 410*b* includes a branched pipe exhaust pathway 440*b*. In a plan view, the branched pipe exhaust pathways 440*b* are located farther away from the connector 460 than the second collecting pipe 454 is.

The first branched pipes 410*a* of the first bank 310 extend in a direction away from the connector 460. Each first branched pipe 410*a* of the first bank 310 includes the branched pipe exhaust pathway 440*a*. Each branched pipe exhaust pathway 440*a* is located at a separation position farther away from the connector 460 than the first collecting pipe 452 is. The first branched pipes 410*a* extend from the exhaust ports 350*a*. Downstream from the branched pipe exhaust pathway 440*a*, each first branched pipe 410*a* is connected to the first collecting pipe 452. The first branched pipes 410*a* are not immediately connected to the first collecting pipe 452 from the exhaust ports 350*a* but are connected to the first collecting pipe 452 at the separation position. Extending the first branched pipes 410*a* to the separation positions elongates the first branched pipes 410*a*.

Accordingly, a pressure of exhaust gas from a first cylinder takes time to pass through the first branched pipes 410*a*, which delays transmittance of the pressure to the other first cylinder(s). This significantly reduces or prevents exhaust interference.

Similarly, in the second bank 320, the second branched pipes 410*b* are not immediately connected to the second collecting pipe 454 from the exhaust ports 350*b* but are connected to the second collecting pipe 454 via the branched pipe exhaust pathways 440*b*. In this manner, it is also possible to prevent exhaust interference in the second bank 320.

An outboard motor according to another preferred embodiment of the present invention includes the preferred embodiment(s) described above.

First branched pipes 410*a* extend from exhaust ports 350*a*. Then, each first branched pipe 410*a* extends through a point VRP1 and away from a first collecting pipe 452 and a second collecting pipe 454. The point VRP1 is on a virtual vertical plane VR1 including the first collecting pipe 452 and the second collecting pipe 454. Furthermore, the first branched pipes 410*a* extend in a direction away from the virtual vertical plane VR1 (a direction toward a back-end 114 of a cowl 110) and then toward to the exhaust ports 350*a*.

Second branched pipes 410*b* extend from exhaust ports 350*b*. Then, each second branched pipe 410*b* extends through a point VRP2, different from the point VRP1, and away from the first collecting pipe 452 and the second collecting pipe 454. The point VRP2 is located in the virtual vertical plane VR1 including the first collecting pipe 452 and the second collecting pipe 454. Furthermore, the second branched pipes 410*b* extend in a direction away from the virtual vertical plane VR1 (for example, the direction toward the back-end 114 of the cowl 110) and then toward the exhaust ports 350*b*.

The first branched pipes 410*a* and the second branched pipes 410*b* extend through points in the virtual vertical plane VR1 and away from the first collecting pipe 452 and the second collecting pipe 454. Separating the first branched pipes 410*a* and the second branched pipes 410*b* from each other makes it possible to elongate the first branched pipes 410*a* and the second branched pipes 410*b* and to significantly reduce or prevent exhaust interference.

An outboard motor according to another preferred embodiment of the present invention includes one or more of the preferred embodiment(s) described above. Branched pipe exhaust pathways 440*a* are spaced apart from a first collecting pipe 452 and extend around the first collecting pipe 452. Branched pipe exhaust pathways 440*b* are spaced apart from a second collecting pipe 454 and extend around the second collecting pipe 454.

Extending the first branched pipes 410*a* and second branched pipes 410*b* elongates the first branched pipes 410*a* and the second branched pipes 410*b*, significantly reducing or preventing exhaust interference.

An outboard motor according to another preferred embodiment of the present invention includes one or more of the preferred embodiment(s) described above.

The outboard motor according to the present preferred embodiment is different from the preferred embodiment(s) above in that the outboard motor further includes an exhaust opening 458. The exhaust opening 458 is connected to an exhaust pathway 450 of an exhaust guide 240. The exhaust guide 240 is disposed in a lower portion of a cowl 110 that houses an engine 300, and the exhaust guide 240 is attached to the cowl 110.

In a plan view, a connector 460 is located closer to a back-end 114 of the cowl 110 than the exhaust opening 458 is. In a plan view, a first collecting pipe 452 and a second collecting pipe 454 are located closer to the back-end 114 of the cowl 110 than the connector 460 is. In a plan view, branched pipe exhaust pathways 440*a* and branched pipe exhaust pathways 440*b* are located closer to the back-end 114 of the cowl 110 than the first collecting pipe 452 and the second collecting pipe 454 are.

The branched pipe exhaust pathways 440*a* and the branched pipe exhaust pathways 440*b* are located on the side close to the back-end 114 of the cowl 110, which makes it possible to elongate the first branched pipes 410*a* and second branched pipes 410*b* and to significantly reduce or prevent exhaust interference. Furthermore, it is possible to effectively use a space on the side close to the back-end 114 of the cowl 110.

An outboard motor according to another preferred embodiment of the present invention includes one or more of the preferred embodiment(s) described above. In a plan view, first branched pipes 410*a* and second branched pipes 410*b* are spaced apart from each other as they extend toward the branched pipe exhaust pathways 440*a* and branched pipe exhaust pathways 440*b*.

Separating the first branched pipes 410*a* and the second branched pipes 410*b* from each other makes it possible to elongate the first branched pipes 410*a* and the second branched pipes 410*b* and to significantly reduce or prevent exhaust interference.

An outboard motor according to another preferred embodiment of the present invention includes one or more of the preferred embodiment(s) described above.

The outboard motor according to the present preferred embodiment further includes a crankshaft 210. The crankshaft 210 extends in the vertical direction. The crankshaft 210 transmits a driving force from an engine 300 to a propeller shaft 250. In a plan view, first branched pipes 410*a* and second branched pipes 410*b* are axisymmetric with respect to a virtual vertical plane VR2. The virtual vertical plane VR2 includes an exhaust opening 458 and a connector 460 and extends parallel to the vertical direction. In a plan view, a first collecting pipe 452 and a second collecting pipe 454 are axisymmetric with respect to the virtual vertical plane VR2 that includes the exhaust opening 458 and the connector 460.

Due to the axisymmetric first branched pipes 410*a* and second branched pipes 410*b*, it is possible to adjust the timing to transmit exhaust pressures of the first branched pipes 410*a* and the timing to transmit exhaust pressures of the second branched pipes 410*b*.

An outboard motor according to another preferred embodiment of the present invention includes one or more of the preferred embodiment(s) described above. Each first branched pipe 410*a* is connected to a first collecting pipe 452 via a fifth curved portion 432 in a back view. The fifth curved portion 432 extends downward in the vertical direction. Each second branched pipe 410*b* is connected to a second collecting pipe 454 via a fifth curved portion 432 in a back view. The fifth curved portion 432 extends downward in the vertical direction.

It is possible to smooth a flow of exhaust gas from the first branched pipes 410*a* to the first collecting pipe 452 and a flow of exhaust gas from the second branched pipes 410*b* to the second collecting pipe 454, which significantly reduces or prevents pressure loss.

An outboard motor according to another preferred embodiment of the present invention includes an engine 300, a propeller shaft 250, a cowl 110, first branched pipes 410*a*, second branched pipes 410*b*, a first collecting pipe 452, and a second collecting pipe 454.

The engine 300 includes cylinders C1, C2, C3, C4, C5, C6, C7, and C8, and exhaust ports 350. The exhaust ports 350 are respectively connected to the cylinders C1, C2, C3, C4, C5, C6, C7, and C8.

The propeller shaft 250 extends in a front-back direction. The propeller shaft 250 transmits a driving force from the engine 300 to a propeller.

The cowl 110 includes a front-end and a back-end. The cowl 110 houses the engine 300.

The first branched pipes 410*a* and the second branched pipes 410*b* are both connected to the exhaust ports 350. The first collecting pipe 452 and the second collecting pipe 454 are connected to the first branched pipes 410*a* and the second branched pipes 410*b*.

The first branched pipes 410*a* and the second branched pipes 410*b* extend toward the back-end 114 of the cowl 110. Each first branched pipe 410*a* and each second branched pipe 410*b* includes a first exhaust pathway and a second exhaust pathway. The first exhaust pathways and the second exhaust pathways are located between the first collecting pipe 452 or the second collecting pipe 454 and the back-end 114 of the cowl 110.

The first branched pipes 410*a* and the second branched pipes 410*b* extend to the back-end 114 of the cowl 110, which elongates the first branched pipes 410*a* and the second branched pipes 410*b* and significantly reduces or prevents exhaust interference. Furthermore, it is possible to effectively use a space on the side close to the back-end 114 of the cowl 110.

An outboard motor according to another preferred embodiment of the present invention includes one or more of the preferred embodiment(s) described above. First exhaust pathways and second exhaust pathways are spaced apart from a first collecting pipe 452 and a second collecting pipe 454 and extend around the first collecting pipe 452 and the second collecting pipe 454.

Extending the first branched pipes 410*a* and second branched pipes 410*b* elongates the first branched pipes 410*a* and the second branched pipes 410*b*, significantly reducing or preventing exhaust interference.

An outboard motor according to another preferred embodiment of the present invention includes one or more of the preferred embodiment(s) described above.

The outboard motor according to the present preferred embodiment further includes an exhaust opening 458. The exhaust opening 458 is connected to an exhaust pathway 450 of an exhaust guide 240. The exhaust guide 240 is attached to a cowl 110.

A first collecting pipe 452 and a second collecting pipe 454 are located closer to a back-end 114 of the cowl 110 than the exhaust opening 458 is. First exhaust pathways and second exhaust pathways are located closer to the back-end 114 of the cowl 110 than the first collecting pipe 452 and the second collecting pipe 454 are.

The first exhaust pathways and the second exhaust pathways are located on the side close to the back-end 114 of the cowl 110, which elongates the first branched pipes 410*a* and second branched pipes 410*b* and significantly reduces or prevents exhaust interference. Furthermore, it is possible to effectively use a space on the side close to the back-end 114 of the cowl 110.

An outboard motor according to another preferred embodiment of the present invention includes one or more of the preferred embodiment(s) described above. Each first branched pipe 410*a* and each second branched pipe 410*b* are connected to a first collecting pipe 452 and a second collecting pipe 454 via a fifth curved portion 432 in a back view. The fifth curved portion 432 extends downward in the vertical direction.

It is possible to smooth flows of combustion gas from the first branched pipes 410*a* and the second branched pipes 410*b* to the first collecting pipe 452 and the second collecting pipe 454, significantly reducing or preventing pressure loss.

An outboard motor according to another preferred embodiment of the present invention includes an engine 300, first branched pipes 410*a*, second branched pipes 410*b*, a first collecting pipe 452, and a second collecting pipe 454.

The engine 300 includes cylinders C1, C2, C3, C4, C5, C6, C7, and C8, exhaust ports 350, and a crankshaft 210.

The cylinders C1, C2, C3, C4, C5, C6, C7, and C8 each include a connecting rod 370. The exhaust ports 350 are respectively connected to the cylinders C1, C2, C3, C4, C5, C6, C7, and C8. The connecting rods 370 are connected to the crankshaft 210.

The first branched pipes 410*a* and the second branched pipes 410*b* are both connected to the exhaust ports 350. The first collecting pipe 452 and the second collecting pipe 454 are located farther away from the crankshaft 210 than the exhaust ports 350 are. The first collecting pipe 452 and the second collecting pipe 454 are connected to the first branched pipes 410*a* and the second branched pipes 410*b*.

The first branched pipes 410*a* and the second branched pipes 410*b* extend in a direction away from the crankshaft 210. Each first branched pipe 410*a* and each second branched pipe 410*b* include a first exhaust pathway and a second exhaust pathway. The first exhaust pathways and the second exhaust pathways are located farther away from the crankshaft 210 than the first collecting pipe 452 and the second collecting pipe 454 are.

Elongation of the first branched pipes 410a and the second branched pipes 410b significantly reduces or prevents exhaust interference.

An outboard motor according to another preferred embodiment of the present invention includes one or more of the preferred embodiment(s) described above. First exhaust pathways and second exhaust pathways are spaced apart from a first collecting pipe 452 and a second collecting pipe 454 and extend around the first collecting pipe 452 and the second collecting pipe 454.

Extending the first branched pipes 410a and second branched pipes 410b elongates the first branched pipes 410a and the second branched pipes 410b, significantly reducing or preventing exhaust interference.

An outboard motor according to another preferred embodiment of the present invention includes one or more of the preferred embodiment(s) described above.

The outboard motor according to the present preferred embodiment further includes an exhaust opening 458.

The exhaust opening 458 is connected to an exhaust pathway 450 of an exhaust guide 240. A first collecting pipe 452 and a second collecting pipe 454 are located between the exhaust opening 458 and a first exhaust pathway and between the exhaust opening 458 and a second exhaust pathway.

Elongation of the first branched pipes 410a and the second branched pipes 410b significantly reduces or prevents exhaust interference.

As described below, the propeller shaft 250 extends in the front-back direction. The propeller 220 is mounted to a back-end of the propeller shaft 250. The back portion, back, and back side are on the side to which the propeller 220 is mounted along the propeller shaft 250. The front portion, front, and front side are on the opposite side of the propeller 220 along the propeller shaft 250.

Furthermore, the front portion, front, and front side may be in a direction toward a hull (not shown) to which the outboard motor 10 is mounted. The back portion, back, and back side may be away from the hull to which the outboard motor 10 is mounted.

The upper portion, upside, and upper side are in a direction toward the sky. For example, the upper portion, upside, and upper side are on the side where the engine 300 and the cowl 110 to be described are located. The lower portion, downside, and lower side are in a direction toward the water surface or the water. For example, the lower portion, downside, and lower side are on the side close to the propeller 220 to be described below. The vertical direction refers to the up-down direction, or a direction of gravity, that is, a direction shown by a thread hanging an object. The horizontal direction is a direction perpendicular to the vertical direction and orthogonal to the earth's gravity.

The right portion, right, and right side are in a rightward direction from the outboard motor 10 toward the hull. The left portion, left, and left side are in a leftward direction from the outboard motor 10 toward the hull.

Figure 1:
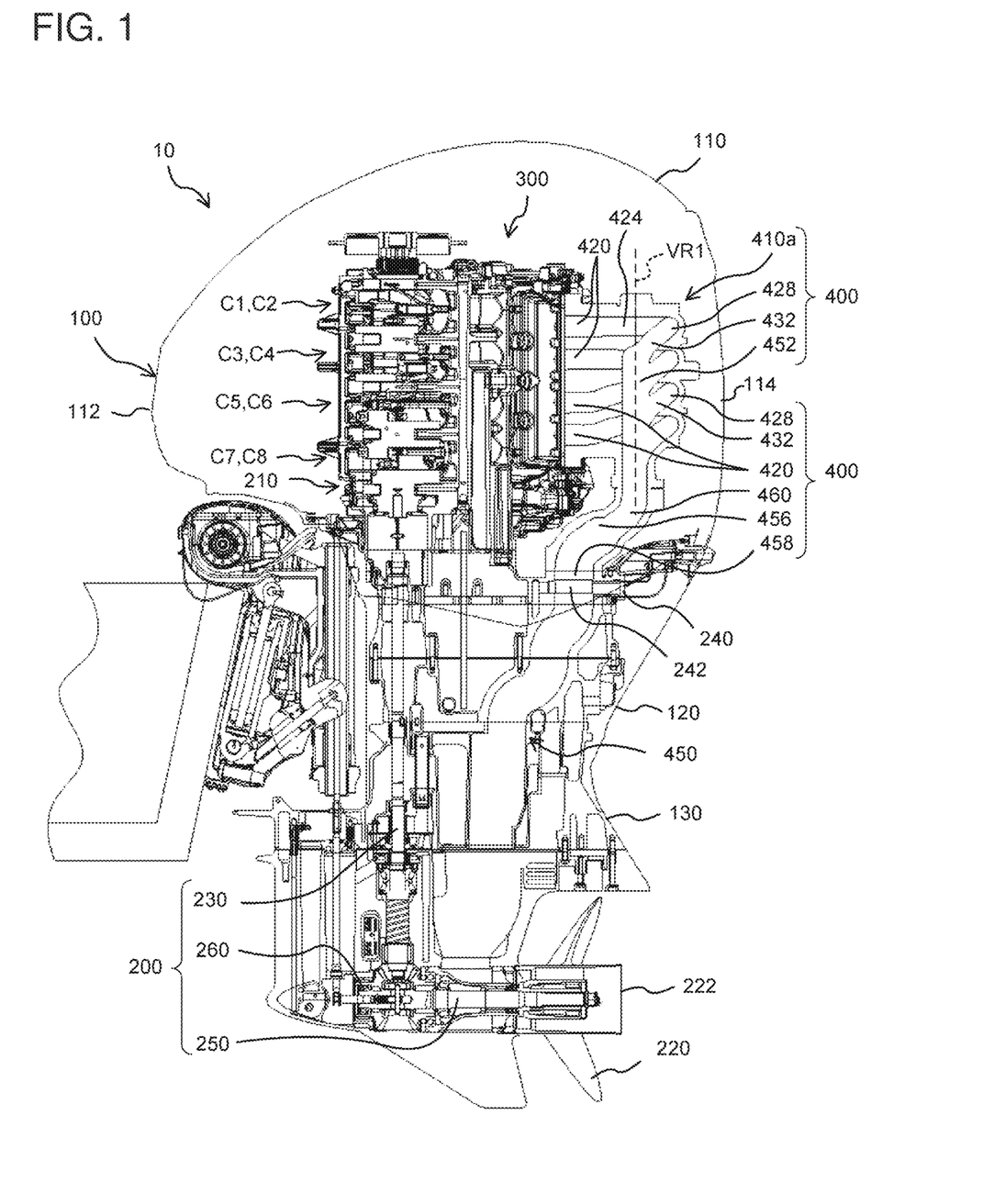
FIG. 1 is a side view of an outboard motor according to a preferred embodiment of the present invention.
Figure 2:
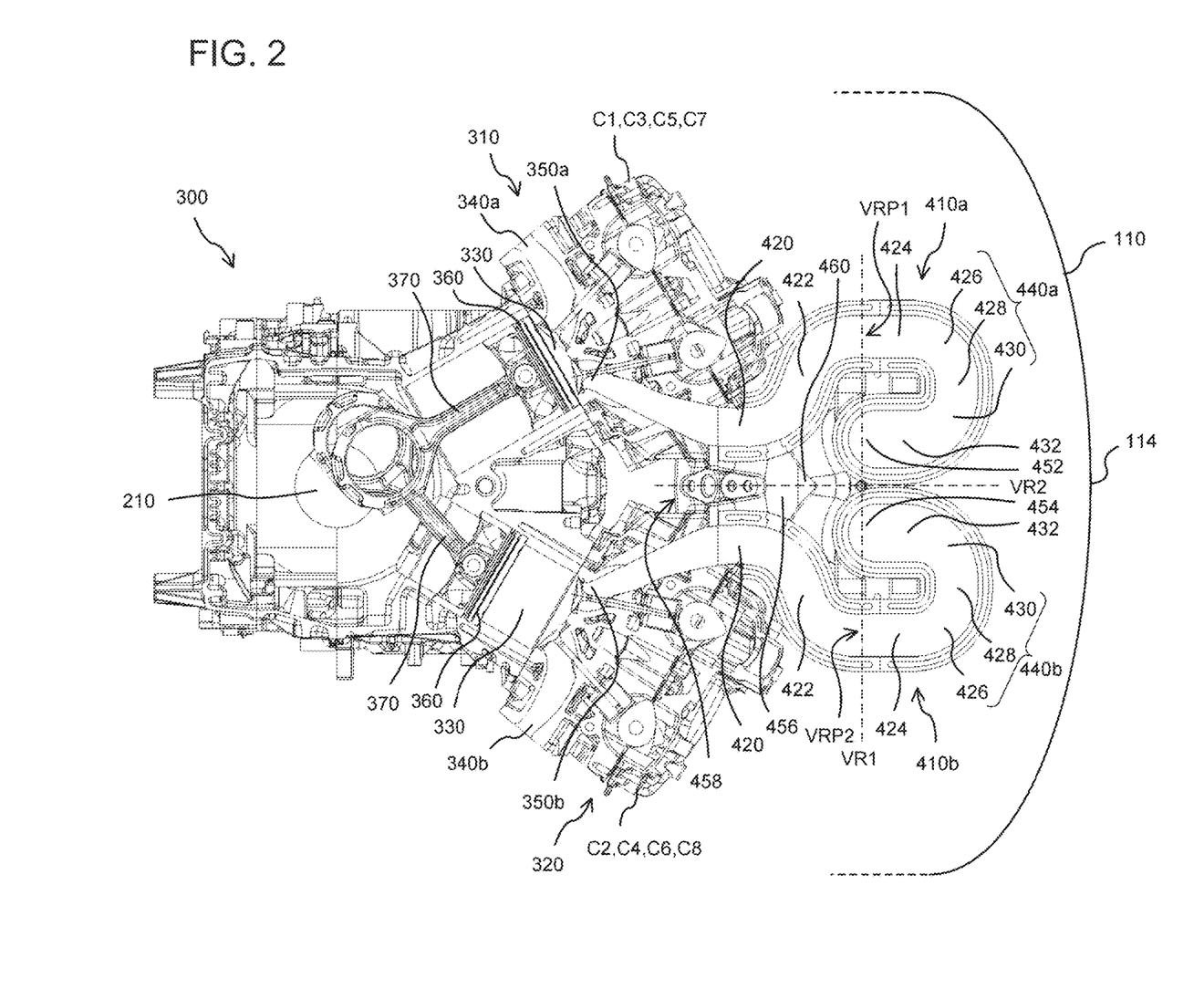
FIG. 2 is a plan view of an engine.
Figure 3:
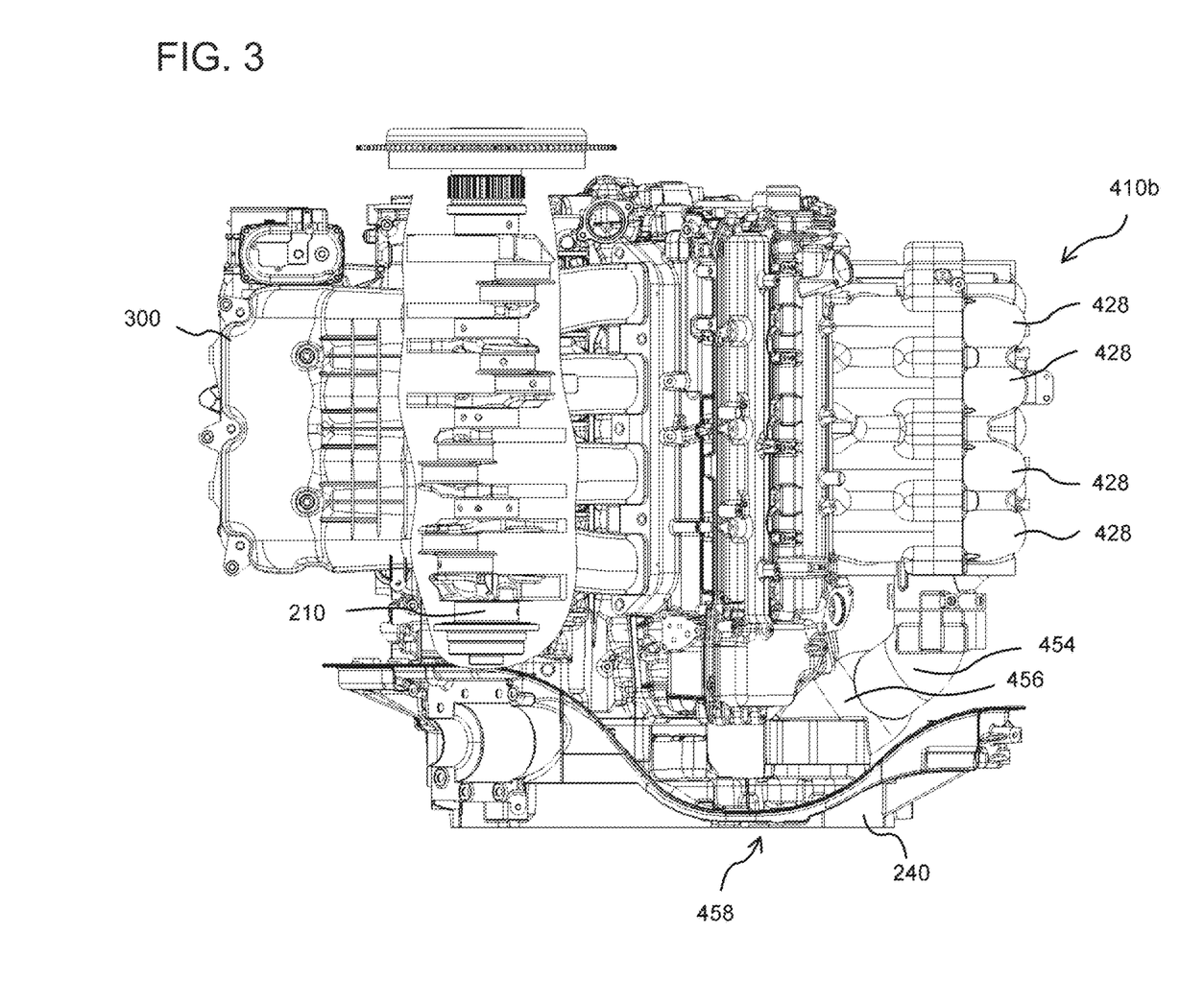
FIG. 3 is a schematic view showing a left side surface of the engine.
Figure 4:
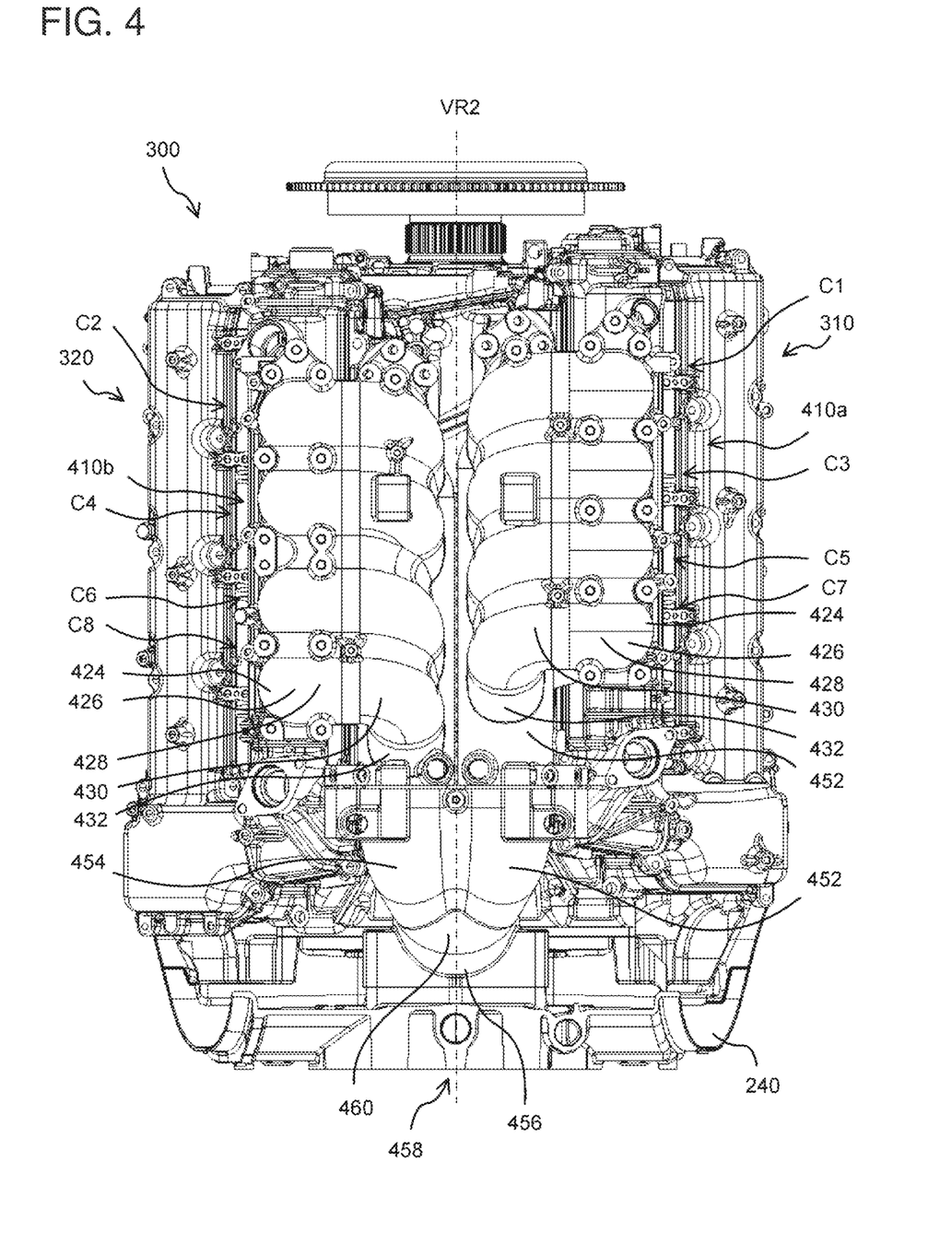
FIG. 4 is a schematic view showing the back of the engine.

Hereinafter, additional preferred embodiments of the present invention will be described with reference to the drawings. FIG. 1 is a side view of the outboard motor 10 according to the present preferred embodiment. FIG. 2 is a plan view of the engine 300. FIG. 3 is a schematic view showing a left side surface of the engine 300. FIG. 4 is a schematic view showing the back of the engine 300.

The outboard motor 10 mainly includes a housing 100, the engine 300, a power transmission mechanism 200, and an exhaust mechanism 400.

As shown in FIG. 1, the housing 100 mainly includes the cowl 110, an apron 120, and an upper casing 130. The cowl 110 covers the engine 300. The cowl 110 includes a front-end 112 at the front of the housing 100 and a back-end 114 at the back. The apron 120 is located below the cowl 110. The apron 120 covers a drive shaft 230. The apron 120 is located below the exhaust guide 240. The exhaust guide 240 is disposed at a fixed position in the cowl 110. The exhaust guide 240 is located below the engine 300. The apron 120 and engine 300 are fixed to the exhaust guide 240. The upper casing 130 is located below the apron 120. The upper casing 130 covers the propeller shaft 250.

The power transmission mechanism 200 transmits a driving force from the engine 300 to the propeller 220. The power transmission mechanism 200 includes the drive shaft 230, the propeller shaft 250, and a shift mechanism 260. The drive shaft 230 extends in the vertical direction. The drive shaft 230 is attached to the crankshaft 210. The drive shaft 230 is rotated by the engine 300.

The propeller shaft 250 is attached to a lower portion of the drive shaft 230 via the shift mechanism 260. The propeller shaft 250 extends in the front-back direction. The propeller shaft 250 extends perpendicular or substantially perpendicular to the drive shaft 230. The propeller 220 is mounted to the back-end of the propeller shaft 250. The propeller shaft 250 transmits a driving force from the drive shaft 230 to the propeller 220.

The propeller 220 is located in a lower portion of the outboard motor 10. The propeller 220 is rotationally driven by a driving force from the engine 300. The shift mechanism 260 switches rotation directions of power transmitted from the drive shaft 230 to the propeller shaft 250.

As shown in FIG. 2, the engine 300 includes the first bank 310 and the second bank 320. The first bank 310 includes the first cylinder C1, the third cylinder C3, the fifth cylinder C5, and the seventh cylinder C7. The second bank 320 includes the second cylinder C2, the fourth cylinder C4, the sixth cylinder C6, and the eighth cylinder C8. The first bank 310 and second bank 320 are arranged in a V-shape. The engine 300 is thus preferably a V-type 8-cylinder engine.

The cylinders of the first bank 310 are arranged side by side in the order of the cylinder C1, the cylinder C3, the cylinder C5, and the cylinder C7. The cylinders of the second bank 320 are arranged side by side in the order of the cylinder C2, the cylinder C4, the cylinder C6, and the cylinder C8.

Each of the cylinders C1 to C8 includes a reciprocating piston 360. The pistons 360 are connected to the crankshaft 210 via the connecting rods 370. The reciprocating motions of the pistons 360 are converted into rotational motions by the connecting rods 370 and the crankshaft 210.

The cylinders C1 to C8 each include a combustion chamber 330, an intake port 340, and the exhaust port 350. The intake ports 340 and the exhaust port 350 are connected to the combustion chambers 330, respectively. The cylinders C1 to C8 each include two intake ports 340a and 340b and two exhaust ports 350a and 350b. When there is no need to distinguish between the two intake ports 340a and 340b, they are simply referred to as "intake ports 340." When there is no need to distinguish between the two exhaust ports 350a and 350b, they are simply referred to as "exhaust ports 350."

As shown in FIGS. 1 and 2, the exhaust mechanism 400 discharges combustion gas generated in the combustion chamber 330 of each of the cylinders C1 to C8 to the outside of the outboard motor 10. The exhaust mechanism 400 includes the first branched pipes 410a, the second branched pipes 410b, and the exhaust pathway 450. The exhaust pathway 450 includes the first collecting pipe 452, the second collecting pipe 454, a third collecting pipe 456, an exhaust pathway 242 of the exhaust guide 240, a pathway inside the apron 120, a pathway inside the upper casing 130, and a pathway to a back-end of the propeller 220. The back-end of the propeller 220 includes an outlet 222. The outlet 222 opens toward the water. The combustion gas from the cylinders C1 to C8 is guided from the first branched pipes 410a and the second branched pipes 410b to the outlet 222 and discharged from the outlet 222. In the exhaust mechanism 400, the side close to the cylinders C1 to C8 is referred to as the upper side, and the side close to the outlet 222 is referred to as the lower side.

The first collecting pipe 452 is located on the side close to the first bank 310. The second collecting pipe 454 is located on the side close to the second bank 320. The first collecting pipe 452 and the second collecting pipe 454 preferably have a tubular shape. The first collecting pipe 452 and the second collecting pipe 454 extend in the vertical direction.

As shown in FIG. 2, the first collecting pipe 452 is connected to the exhaust ports 350 of the four cylinders C1, C3, C5, and C7 of the first bank 310 via the first branched pipes 410a to be described below. As shown in FIG. 4, the combustion gas from the cylinders C1, C3, C5, and C7 passes through the first branched pipes 410a and is mixed in the first collecting pipe 452.

As shown in FIG. 2, the second collecting pipe 454 is connected to the exhaust ports 350 of the four cylinders C2, C4, C6, and C8 of the second bank 320 via the second branched pipes 410b to be described below. As shown in FIG. 4, the combustion gas from the cylinders C2, C4, C6, and C8 passes through the second branched pipes 410b and is mixed in the second collecting pipe 454.

As shown in FIGS. 1 and 4, the first collecting pipe 452 and the second collecting pipe 454 are connected to an upper portion of the third collecting pipe 456 at the lower portion of the cowl 110. The third collecting pipe 456 is connected to the first collecting pipe 452 and the second collecting pipe 454 at the connector 460. The third collecting pipe 456 is located below the first collecting pipe 452 and the second collecting pipe 454. The third collecting pipe 456 preferably has a tubular shape. The third collecting pipe 456 extends in the vertical direction. The third collecting pipe 456 has a diameter larger than that of the first collecting pipe 452 and the second collecting pipe 454.

As shown in FIG. 1, the third collecting pipe 456 includes the exhaust opening 458 at a lower portion thereof. The exhaust opening 458 is connected to the exhaust pathway 242 of the exhaust guide 240. The first collecting pipe 452, the second collecting pipe 454, and the third collecting pipe 456 are located above the exhaust guide 240. The third collecting pipe 456 is located behind the exhaust pathway 242 of the exhaust guide 240. The first collecting pipe 452 and the second collecting pipe 454 are located behind the third collecting pipe 456. The third collecting pipe 456 is located between the exhaust pathway 242 of the exhaust guide 240 and the first collecting pipe 452 and the second collecting pipe 454.

The first branched pipes 410a are respectively connected to the exhaust ports 350 of the cylinders C1, C3, C5, C7 of the first bank 310 and connected to the first collecting pipe 452. The first branched pipes 410a guide the combustion gas from the cylinders C1, C3, C5, and C7 to the first collecting pipe 452. The second branched pipes 410b are respectively connected to the exhaust ports 350 of the cylinders C2, C4, C6, and C8 of the second bank 320 and connected to the second collecting pipe 454. The second branched pipes 410b guide the combustion gas from the cylinders C2, C4, C6, and C8 to the second collecting pipe 454.

The first branched pipes 410a and the second branched pipes 410b preferably have a curved shape as a whole. The first branched pipes 410a and the second branched pipes 410b have a smaller diameter than that of the first collecting pipe 452 and the second collecting pipe 454. As shown in FIG. 2, the first branched pipes 410a and the second branched pipes 410b each include a first curved portion 420, a second curved portion 422, a first straight portion 424, and a third curved portion 426, a second straight portion 428, a fourth curved portion 430, and a fifth curved portion 432.

The first curved portions 420 are connected to the exhaust ports 350. The first curved portions 420 and the second curved portions 422 are preferably S-shaped or substantially S-shaped. The first curved portion 420 and the second curved portion 422 of each first branched pipe 410a and the first curved portion 420 and the second curved portion 422 of each second branched pipe 410b are oriented in directions away from each other. The exhaust pathway 242 of the exhaust guide 240 and the third collecting pipe 456 are located between the first curved portion 420 and the second curved portion 422 of each first branched pipe 410a and the first curved portion 420 and the second curved portion 422 of each second branched pipe 410b.

The first straight portions 424 are connected to the second curved portions 422. The first straight portion 424 of each first branched pipe 410a and the first straight portion 424 of each second branched pipe 410b are parallel or substantially parallel to each other. The first straight portion 424 of each first branched pipe 410a and the first straight portion 424 of each second branched pipe 410b are oriented backward. The first straight portion 424 of each first branched pipe 410a and the first straight portion 424 of each second branched pipe 410b are oriented toward the back-end 114 of the cowl 110.

The third curved portions 426 are connected to the first straight portions 424. The third curved portions 426, the second straight portions 428, and the fourth curved portions 430 are preferably U-shaped or substantially U-shaped.

The third curved portion 426 of each first branched pipe 410a and the third curved portion 426 of each second branched pipe 410b further approach the back-end 114 of the cowl 110. The second straight portions 428 are located closest to the back-end 114 of the cowl 110. The second straight portions 428 are parallel or substantially parallel to the back-end 114 of the cowl 110. The second straight portion 428 of each first branched pipe 410a and the second straight portion 428 of each second branched pipe 410b are aligned in a straight line.

The fourth curved portion 430 of each first branched pipe 410a and the fourth curved portion 430 of each second branched pipe 410b are spaced apart from the back-end 114 of the cowl 110. The third curved portions 426, the second straight portions 428, and the fourth curved portions 430 bend about 180 degrees, for example, which makes the first branched pipes 410a and the second branched pipes 410b approach each other. The third curved portions 426, the second straight portions 428, and the fourth curved portions 430 orient the first branched pipes 410a and the second branched pipes 410b from the rear to the front.

The fifth curved portions 432 are connected to the fourth curved portions 430. The fifth curved portions 432 bend downward. The fifth curved portions 432 connect the first branched pipes 410a to the first collecting pipe 452 and connect the second branched pipes 410b to the second collecting pipe 454.

The first curved portions 420, the second curved portions 422, the first straight portions 424, the third curved portions 426, the second straight portions 428, and the fourth curved portions 430 extend in the horizontal direction preferably in a single plane. The fifth curved portions 432 bend downward in the vertical direction. Detours are defined by the first curved portions 420, the second curved portions 422, the first straight portions 424, the third curved portions 426, the second straight portions 428, the fourth curved portions 430, and the fifth curved portions 432.

Each first branched pipe 410a includes a branched pipe exhaust pathway 440a. Each second branched pipe 410b includes a branched pipe exhaust pathway 440b. Each branched pipe exhaust pathway 440a and each branched pipe exhaust pathway 440b include the third curved portion 426, the second straight portion 428, and the fourth curved portion 430. Each branched pipe exhaust pathway 440a and each branched pipe exhaust pathway 440b may further include, for example, the first curved portion 420, the second curved portion 422, and the first straight portion 424.

The first branched pipes 410a extend in the horizontal direction from the exhaust ports 350 of the cylinders C1, C3, C5, and C7 and extend around the first collecting pipe 452. The first branched pipes 410a are connected to the first collecting pipe 452 via detours that extend around the first collecting pipe 452. The first branched pipes 410a wind around the first collecting pipe 452 and are connected to the first collecting pipe 452.

The second branched pipes 410b extend in the horizontal direction from the exhaust ports 350 of the cylinders C2, C4, C6, and C8 and extend around the second collecting pipe 454. The second branched pipes 410b are connected to the second collecting pipe 454 via detours that extend around the second collecting pipe 454. The second branched pipes 410b wind around the second collecting pipe 454 and are connected to the second collecting pipe 454.

The first branched pipes 410a and the second branched pipes 410b extend along inside the cowl 110. The first branched pipes 410a and the second branched pipes 410b wind inside an internal space of the cowl 110 at the back portion, which elongates the first branched pipes 410a and the second branched pipes 410b. Thus, it is possible to effectively use the internal space at the back portion of the cowl 110.

The first branched pipes 410a are not immediately connected to the first collecting pipe 452 from the exhaust ports 350 of the cylinders C1, C3, C5, and C7, but wind around, and then are connected to the first collecting pipe 452. Thus, it is possible to increase a length of the first branched pipes 410a from the exhaust ports 350 to the first collecting pipe 452.

The second branched pipes 410b are not immediately connected to the second collecting pipe 454 from the exhaust ports 350 of the cylinders C2, C4, C6, and C8, but wind around, and then are connected to the second collecting pipe 454. Thus, it is possible to increase a length of the second branched pipes 410b from the exhaust ports 350 to the second collecting pipe 454.

The engine 300 simultaneously opens the exhaust ports 350 and the intake ports 340 to scavenge gas. This simultaneous opening may cause exhaust interference. The occurrence of exhaust interference decreases combustion efficiency. Exhaust interference is likely to occur in the cylinders C1, C3, C5, C7 of the common first bank 310 and the cylinders C2, C4, C6, C8 of the common second bank 320.

The elongated first branched pipes 410a and second branched pipes 410b increases the time for an exhaust pressure from one cylinder to pass through the first branched pipes 410a and the second branched pipes 410b, which delays transmission of the pressure to a combustion chamber of another cylinder. The exhaust pressure from one cylinder is prevented from reaching a combustion chamber of another cylinder. Even when the exhaust ports 350 and the intake ports 340 are simultaneously opened, the exhaust ports 350 are closed before the exhaust pressure from one cylinder is transmitted to another cylinder. In this manner, it is possible to significantly reduce or prevent exhaust interference.

The first branched pipes 410a and the second branched pipes 410b, and the branched pipe exhaust pathways 440a and the branched pipe exhaust pathways 440b, have the following positional relationships.

In a plan view, the first branched pipes 410a extend in a direction away from the connector 460. Each first branched pipe 410a includes the branched pipe exhaust pathway 440a. The first collecting pipe 452 is located between the branched pipe exhaust pathways 440a of the first branched pipes 410a and the connector 460. The branched pipe exhaust pathways 440a are located farther away from the connector 460 than the first collecting pipe 452 is. With respect to the connector 460, the branched pipe exhaust pathways 440a are located farther away than the first collecting pipe 452 is.

In a plan view, the second branched pipes 410b extend in a direction away from the connector 460. Each second branched pipe 410b includes the branched pipe exhaust pathway 440b. The second collecting pipe 454 is located between the branched pipe exhaust pathways 440b of the second branched pipes 410b and the connector 460. The branched pipe exhaust pathways 440b are located farther away from the connector 460 than the second collecting pipe 454 is. With respect to the connector 460, the branched pipe exhaust pathways 440b are located farther away than the second collecting pipe 454 is.

The first collecting pipe 452 is located between the branched pipe exhaust pathways 440a and the exhaust opening 458. The first collecting pipe 452 is disposed between the exhaust opening 458 and the first straight portion 424, the third curved portion 426, the second straight portion 428, and the fourth curved portion 430 of each first branched pipe 410a.

The second collecting pipe 454 is located between the branched pipe exhaust pathways 440b and the exhaust opening 458. The second collecting pipe 454 is disposed between the exhaust opening 458 and the first straight portion 424, the third curved portion 426, the second straight portion 428, the fourth curved portion 430 of each second branched pipe 410b.

The virtual vertical plane VR1 includes the first collecting pipe 452 and the second collecting pipe 454.

First branched pipes 410a extend from exhaust ports 350a. Each first branched pipes 410a passes through the point VRP1 in the virtual vertical plane VR1 and away from the first collecting pipe 452 and the second collecting pipe 454. The first branched pipes 410a extend in a direction away from the virtual vertical plane VR1 (a direction toward the back-end 114 of the cowl 110). The first branched pipes 410a are oriented toward the first collecting pipe 452.

Second branched pipes 410b extend from exhaust ports 350b. Each second branched pipe 410b passes through the point VRP2 in the virtual vertical plane VR1 and away from the first collecting pipe 452 and the second collecting pipe 454. The second branched pipes 410b extend in a direction away from the virtual vertical plane VR1 (the direction toward the back-end 114 of the cowl 110). The second branched pipes 410b are oriented toward the second collecting pipe 454.

The branched pipe exhaust pathways 440a are spaced apart from the first collecting pipe 452 and the second collecting pipe 454. The branched pipe exhaust pathways 440a extend around the first collecting pipe 452 and the second collecting pipe 454. The branched pipe exhaust pathways 440b are spaced apart from the first collecting pipe 452 and the second collecting pipe 454. The branched pipe exhaust pathways 440b extend around the first collecting pipe 452 and the second collecting pipe 454.

In a plan view, the connector 460 is located closer to a back-end 114 of the cowl 110 than the exhaust opening 458 is. In a plan view, the first collecting pipe 452 and the second collecting pipe 454 are located closer to the back-end 114 of the cowl 110 than the connector 460 is. In a plan view, the first collecting pipe 452 and the second collecting pipe 454 are located between the connector 460 and the back-end 114 of the cowl 110. In a plan view, the branched pipe exhaust pathways 440a and the branched pipe exhaust pathways 440b are located closer to the back-end 114 of the cowl 110 than the first collecting pipe 452 and the second collecting pipe 454 are.

In a plan view, the first branched pipes 410a and the second branched pipes 410b are spaced apart from each other as they extend toward the branched pipe exhaust pathways 440a and the branched pipe exhaust pathways 440b.

The virtual vertical plane VR2 includes the exhaust opening 458 and the connector 460. In a plan view, the first branched pipes 410a and the second branched pipes 410b are axisymmetric with respect to the virtual vertical plane VR2. In a plan view, the first collecting pipe 452 and the second collecting pipe 454 are axisymmetric with respect to the virtual vertical plane VR2.

In a side view, the first branched pipes 410a are connected to the first collecting pipe 452 via the fifth curved portions 432. The fifth curved portions 432 extend downward in the vertical direction. In a side view, the second branched pipes 410b are connected to the second collecting pipe 454 via the fifth curved portions 432. The fifth curved portions 432 extend downward in the vertical direction.

The first collecting pipe 452, the second collecting pipe 454, and the third collecting pipe 456 preferably have a tubular shape and extend in the vertical direction. A lower portion of the first collecting pipe 452 and a lower portion of the second collecting pipe 454 are connected to the upper portion of the third collecting pipe 456. The lower portion of the third collecting pipe 456 includes the exhaust opening 458. The exhaust pathway 450 includes the first collecting pipe 452, the second collecting pipe 454, the third collecting pipe 456, the exhaust pathway 242 of the exhaust guide 240, the pathway inside the apron 120, the pathway inside the upper casing 130, and the outlet 222 at the back-end of the propeller 220. The exhaust opening 458 of the third collecting pipe 456 communicates with the outlet 222 of the propeller 220.

The combustion gas from the exhaust ports 350a and 350b is smoothly guided downward, which reduces the pressure loss.

First Modified Preferred Embodiment

A first modified preferred embodiment of the present invention is an example in which the first curved portions 420, the second curved portions 422, the first straight portions 424, the third curved portions 426, the second straight portions 428, and the fourth curved portions 430 extend in a single plane. These portions may extend in the vertical direction or may extend over a plurality of planes.

Second Modified Preferred Embodiment

A second modified preferred embodiment of the present invention is an example in which the first curved portions 420, the second curved portions 422, the first straight portions 424, the third curved portions 426, the second straight portions 428, and the fourth curved portions 430 include an S-shape and a U-shape. These portions may have a plurality of S-shapes or a plurality of U-shapes or may have a winding shape.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an engine including a first bank including a plurality of first cylinders and a plurality of first exhaust ports connected to the plurality of first cylinders, and a second bank including a plurality of second cylinders and a plurality of second exhaust ports connected to the plurality of second cylinders;
   a propeller shaft extending in a front-back direction of the outboard motor to transmit a driving force from the engine to a propeller;
   a plurality of first branched pipes connected to the plurality of first exhaust ports;
   a plurality of second branched pipes connected to the plurality of second exhaust ports;
   a first collecting pipe connected to the plurality of first branched pipes;
   a second collecting pipe connected to the plurality of second branched pipes; and
   a connector connected to the first collecting pipe and the second collecting pipe; wherein
   the plurality of first branched pipes extend in a direction away from the connector in a plan view of the outboard motor, and include a first exhaust pathway located farther away from the connector than the first collecting pipe is in the plan view; and
   the plurality of second branched pipes extend in a direction away from the connector in the plan view and include a second exhaust pathway located farther away from the connector than the second collecting pipe is in the plan view.

2. The outboard motor according to claim 1, wherein
   the plurality of first branched pipes extend from the first exhaust port and rearward across a virtual vertical plane including the first collecting pipe and the second collecting pipe, and then toward the first exhaust port; and
   the plurality of second branched pipes extend from the second exhaust port and rearward across the virtual vertical plane including the first collecting pipe and the second collecting pipe, and then toward the second exhaust port.

3. The outboard motor according to claim 1, wherein
   the first exhaust pathway is spaced apart from the first collecting pipe and extends around the first collecting pipe; and the second exhaust pathway is spaced apart from the second collecting pipe and extends around the second collecting pipe.

4. The outboard motor according to claim 1, further comprising:
an exhaust opening disposed at a lower portion of a cowl that houses the engine and connected to an exhaust pathway of an exhaust guide attached to the cowl; wherein
the connector is located closer to a back-end of the cowl than the exhaust opening is in the plan view;
the first collecting pipe and the second collecting pipe are located closer to the back-end of the cowl than the connector is in the plan view; and
the first exhaust pathway and the second exhaust pathway are located closer to the back-end of the cowl than the first collecting pipe and the second collecting pipe are in the plan view.

5. The outboard motor according to claim 1, wherein the plurality of first branched pipes and the plurality of second branched pipes are spaced apart from each other in the plan view as the plurality of first branched pipes and the plurality of second branched pipes extend toward the first exhaust pathway and the second exhaust pathway.

6. The outboard motor according to claim 4, further comprising:
a drive shaft extending in a vertical direction to transmit a driving force from the engine to the propeller shaft; wherein
the plurality of first branched pipes and the plurality of second branched pipes, and the first collecting pipe and the second collecting pipe, are axisymmetric in the plan view with respect to a virtual vertical plane that includes the exhaust opening and the connector.

7. The outboard motor according to claim 1, wherein the plurality of first branched pipes are connected to the first collecting pipe via a first curved connector that extends downward in a vertical direction; and
the plurality of second branched pipes are connected to the second collecting pipe via a second curved connector that extends downward in the vertical direction.

8. An outboard motor comprising:
an engine including a plurality of cylinders and a plurality of exhaust ports connected to the plurality of cylinders;
a propeller shaft extending in a front-back direction of the outboard motor to transmit a driving force from the engine to a propeller;
a cowl including a front-end and a back-end that houses the engine;
a plurality of branched pipes connected to the plurality of exhaust ports; and
a collecting pipe connected to the plurality of branched pipes; wherein
the plurality of branched pipes extend toward the back-end of the cowl and include an exhaust pathway located between the collecting pipe and the back-end of the cowl.

9. The outboard motor according to claim 8, wherein the exhaust pathway extends around the collecting pipe and is spaced apart from the collecting pipe.

10. The outboard motor according to claim 8, further comprising:
an exhaust opening connected to an exhaust pathway of an exhaust guide attached to the cowl; wherein
the collecting pipe is located closer to the back-end of the cowl than the exhaust opening is; and
the exhaust pathway is located closer to the back-end of the cowl than the collecting pipe is.

11. The outboard motor according to claim 8, wherein the plurality of branched pipes are connected to the collecting pipe via a curved connector that extends downward in a vertical direction.

12. An engine structure comprising:
an engine including a plurality of cylinders including a connecting rod, a plurality of exhaust ports connected to the plurality of cylinders, and a crankshaft connected to the connecting rod;
a plurality of branched pipes connected to the plurality of exhaust ports;
a collecting pipe located farther away from the crankshaft than the plurality of exhaust ports are and connected to the plurality of branched pipes; wherein
the plurality of branched pipes extend in a direction away from the crankshaft and include an exhaust pathway located farther away from the crankshaft than the collecting pipe is.

13. The engine structure according to claim 12, wherein the exhaust pathway extends around the collecting pipe and is spaced apart from the collecting pipe.

14. The engine structure according to claim 12, further comprising:
an exhaust opening connected to an exhaust pathway of an exhaust guide; wherein
the collecting pipe is located between the exhaust opening and the exhaust pathway.

* * * * *